United States Patent
Sasaki et al.

(10) Patent No.: US 9,731,630 B2
(45) Date of Patent: Aug. 15, 2017

(54) SEAT SLIDE DEVICE

(71) Applicant: SHIROKI CORPORATION, Fujisawa-shi (JP)

(72) Inventors: Kazutaka Sasaki, Fujisawa (JP); Norihisa Nozue, Fujisawa (JP); Nobumasa Higashi, Fujisawa (JP); Shingo Ichikawa, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 170 days.

(21) Appl. No.: 14/696,398

(22) Filed: Apr. 25, 2015

(65) Prior Publication Data
US 2015/0321583 A1 Nov. 12, 2015

(30) Foreign Application Priority Data
May 12, 2014 (JP) .................................. 2014-098635

(51) Int. Cl.
*B60N 2/12* (2006.01)
*B60N 2/07* (2006.01)
*B60N 2/08* (2006.01)

(52) U.S. Cl.
CPC ............... *B60N 2/123* (2013.01); *B60N 2/07* (2013.01); *B60N 2/0727* (2013.01); *B60N 2/08* (2013.01); *B60N 2/085* (2013.01); *B60N 2/0825* (2013.01); *B60N 2/12* (2013.01)

(58) Field of Classification Search
CPC ...... B60N 2/123; B60N 2/0727; B60N 2/085; B60N 2/0715; B60N 2/0705
See application file for complete search history.

(56) References Cited

U.S. PATENT DOCUMENTS

| | | | | |
|---|---|---|---|---|
| 6,048,030 A | * | 4/2000 | Kanda | B60N 2/123 297/341 |
| 6,474,739 B1 | * | 11/2002 | Lagerweij | B60N 2/0705 297/341 |
| 7,195,303 B2 | * | 3/2007 | Nihonmatsu | B60N 2/0825 248/429 |
| 2002/0179798 A1 | * | 12/2002 | Fuller | B60N 2/123 248/429 |
| 2007/0278814 A1 | | 12/2007 | Kojima | |
| 2008/0084085 A1 | * | 4/2008 | Mizuno | B60N 2/123 296/65.13 |

(Continued)

FOREIGN PATENT DOCUMENTS

WO  WO 2006/030539 A1  3/2006

*Primary Examiner* — Timothy J Brindley
(74) *Attorney, Agent, or Firm* — McGinn IP Law Group, PLLC (57) ABSTRACT

A seat slide device includes a lower rail, which is provided along a front-and-rear direction; an upper rail, which is movably engaged with the lower rail; a lock mechanism, which is configured to lock and unlock a movement of the upper rail; a walk-in mechanism, which makes a seat be movable into a walk-in area located by unlocking the lock mechanism; and a movable-range restriction unit which: allows the seat to move into the walk-in area when the seat is moved toward the walk-in area from a rear side in a state where the walk-in mechanism is operated; and prevents the seat from moving into the walk-in area when the seat is moved toward the walk-in area from the rear side in a state where the walk-in mechanism is not operated and the lock mechanism is unlocked.

7 Claims, 6 Drawing Sheets (56) References Cited

U.S. PATENT DOCUMENTS

| | | | | |
|---|---|---|---|---|
| 2008/0238127 A1* | 10/2008 | Kojima | ................ | B60N 2/0705 296/65.13 |
| 2008/0309136 A1* | 12/2008 | Kojima | .................... | B60N 2/12 297/340 |
| 2009/0058169 A1* | 3/2009 | Soga | .................... | B60N 2/0705 297/463.1 |
| 2011/0024595 A1* | 2/2011 | Oi | ........................ | B60N 2/0705 248/429 |
| 2012/0119548 A1* | 5/2012 | Abraham | ............. | B60N 2/0825 297/217.1 |
| 2014/0110553 A1* | 4/2014 | Hoshihara | ................ | B60N 2/06 248/429 |
| 2014/0231610 A1* | 8/2014 | Hoshihara | ............ | B60N 2/0705 248/430 |
| 2014/0353454 A1* | 12/2014 | Yamada | ............... | B60N 2/0705 248/430 |
| 2014/0368013 A1* | 12/2014 | Mizuno | ................ | B60N 2/0727 297/340 |
| 2015/0034791 A1* | 2/2015 | Yamada | ............... | B60N 2/0843 248/429 |
| 2015/0306980 A1* | 10/2015 | Furuta | .................... | B60N 2/072 248/429 |
| 2016/0107545 A1* | 4/2016 | Pluta | ........................ | B60N 2/06 297/344.1 |

* cited by examiner

SEAT SLIDE DEVICE

CROSS-REFERENCE TO RELATED APPLICATION

This application claims priority from Japanese Patent Application No. 2014-098635 filed on May 12, 2014, the entire subject matter of which is incorporated herein by reference.

TECHNICAL FIELD

This disclosure relates to a seat slide device including a walk-in mechanism (easy-entry mechanism). The walk-in mechanism unlocks a seat slide lock mechanism due to the forward tilt of a seat back and makes the whole seat be movable forward, thereby facilitating getting in and out to a rear seat.

BACKGROUND

In a front seat of a two-door vehicle without a door for a rear seat, or a second-row seat of a minivan with three rows of seats, a walk-in mechanism is often provided in a seat slide device in order to facilitate the getting in and out to a rear seat (e.g., see WO2006/030539).

SUMMARY

Recently, in order to further improve the getting in and out to a rear seat, there has been suggested a walk-in mechanism that moves a seat further forward than a seat slide range (hereinafter, referred to as "normal slide range") when a seat slide lock mechanism is locked by a handle operation of a user.

In such walk-in mechanism, when the seat slide lock mechanism is unlocked in a state where the walk-in mechanism is not operated and then the seat is slid, there is a case that the seat is moved further forward than the normal slide range of the lock mechanism when load is applied from the rear of the seat.

In this case, the movement distance of the seat for returning to its original position becomes longer.

In consideration of the above, this disclosure s to provide a seat slide device that is capable of preventing the seat from moving further forward than the normal slide range of the lock mechanism when the seat slide lock mechanism is unlocked in a state where the walk-in mechanism is not operated and the seat is slid.

A seat slide device according to this disclosure includes, a lower rail, which is provided on a floor side along a front-and-rear direction; an upper rail, which is provided on a seat side and movably engaged with the lower rail; a lock mechanism, which is configured to lock and unlock a movement of the upper rail; a walk-in mechanism, which makes the seat be movable into a walk-in area located on a front side in the front-and-rear direction by unlocking the lock mechanism due to a forward tilt of a seat back of the seat; and a movable-range restriction unit which: allows the seat to move into the walk-in area when the seat is moved toward the walk-in area from a rear side in a state where the walk-in mechanism is operated; and prevents the seat from moving into the walk-in area when the seat is moved toward the walk-in area from the rear side in a state where the walk-in mechanism is not operated and the lock mechanism is unlocked.

Other features of this disclosure will become more apparent from the embodiments for carrying out the invention (to be described below) and the accompanying drawings.

According to this disclosure, the movable-range restriction unit allows the seat to move into the walk-in area when the seat is moved toward the walk-in area from the rear side in a state where the walk-in mechanism is operated and prevents the seat from moving into the walk-in area when the seat is moved toward the walk-in area from the rear side in a state where the walk-in mechanism is not operated and the lock mechanism is unlocked. Accordingly, the slide range of the seat is restricted to a predetermined range (normal slide range) when the seat slide lock mechanism is unlocked in the non-operating state of the walk-in mechanism and then the seat is slid.

Other effects of this disclosure will become more apparent from the embodiments for carrying out the invention (to be described below) and the accompanying drawings.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 3:
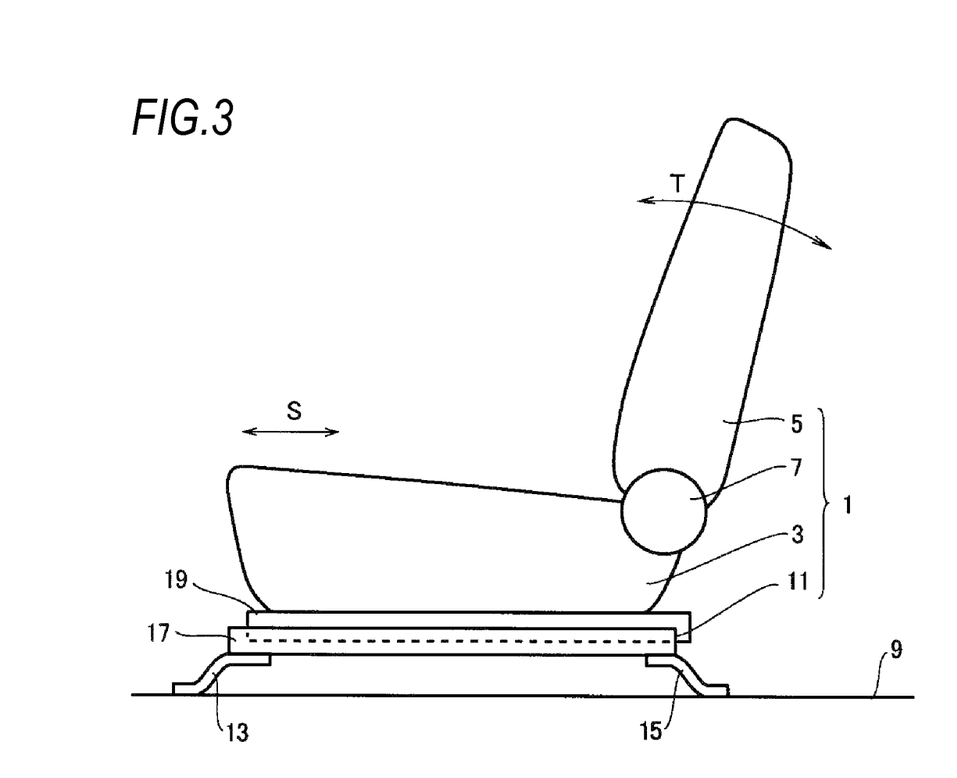
FIG. 3 is a configuration view for explaining a seat equipped with the seat slide device according to the illustrative embodiment.

First, a seat equipped with a seat slide device of the present embodiment will be described with reference to FIG. 3. In FIG. 3, a seat 1 includes a seat cushion 3 for supporting a hip of a user, a seat back 5 for supporting a back of the user and a reclining mechanism 7 for locking/unlocking the tilting of the seat back 5 relative to the seat cushion 3. The seat back 5 is provided so as to be tiltable in a front-and-rear direction (a direction of an arrow T) relative to the seat cushion 3.

A seat slide device 11 is provided between a lower portion of the seat cushion 3 and a floor 9.

The seat slide device 11 of the present embodiment includes a lower rail 17 and an upper rail 19. The lower rail 17 is provided on the floor 9 via brackets 13, 15 along the front-and-rear direction. The upper rail 19 is provided on the seat 1 (seat cushion 3) and movably engaged with the lower rail 17. The upper rail 19 makes the seat 1 be movable in the front-and-rear direction (a direction of an arrow S).

Further, a lock mechanism having a general configuration is provided for locking/unlocking the movement of the upper rail 19. This lock mechanism includes a plurality of lock grooves formed on the lower rail 17 along a longitudinal direction thereof, a lock member provided on the upper rail 19 and a lock biasing unit for biasing the lock member in a direction to be engaged with the lock groove. The lock member can be engaged/disengaged from one of the plurality of lock grooves. Typically, the lock member is engaged with the lock groove by a biasing force of the lock biasing unit, thereby the movement of the upper rail 19 relative to the lower rail 17 is locked. Further, the lock member is disengaged from the lock groove against the biasing force of the lock biasing unit, so that the movement of the upper rail 19 relative to the lower rail 17 is unlocked. Such a configuration is disclosed in JP-A-2013-166434, for example.

Furthermore, the seat slide device of the present embodiment is provided with a walk-in mechanism and a movable-range restriction mechanism.

Figure 1:
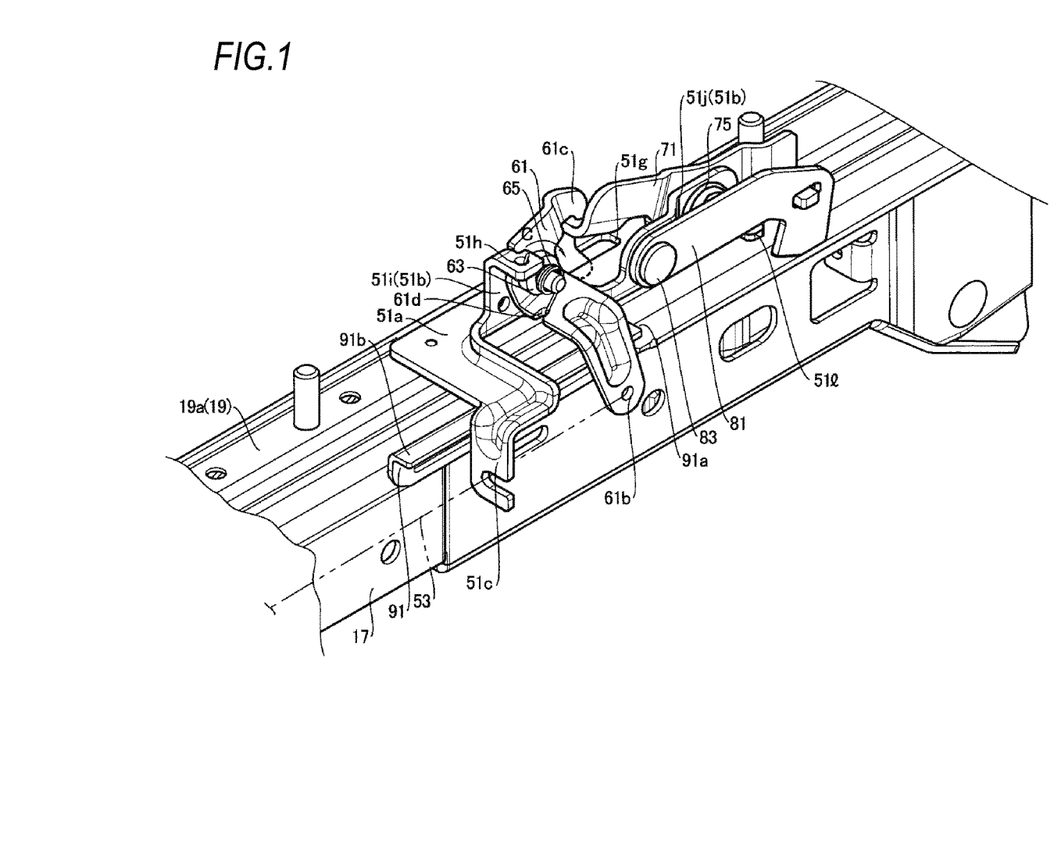
FIG. 1 is a perspective view showing the remarkable part of a seat slide device according to an illustrative embodiment.
Figure 2:
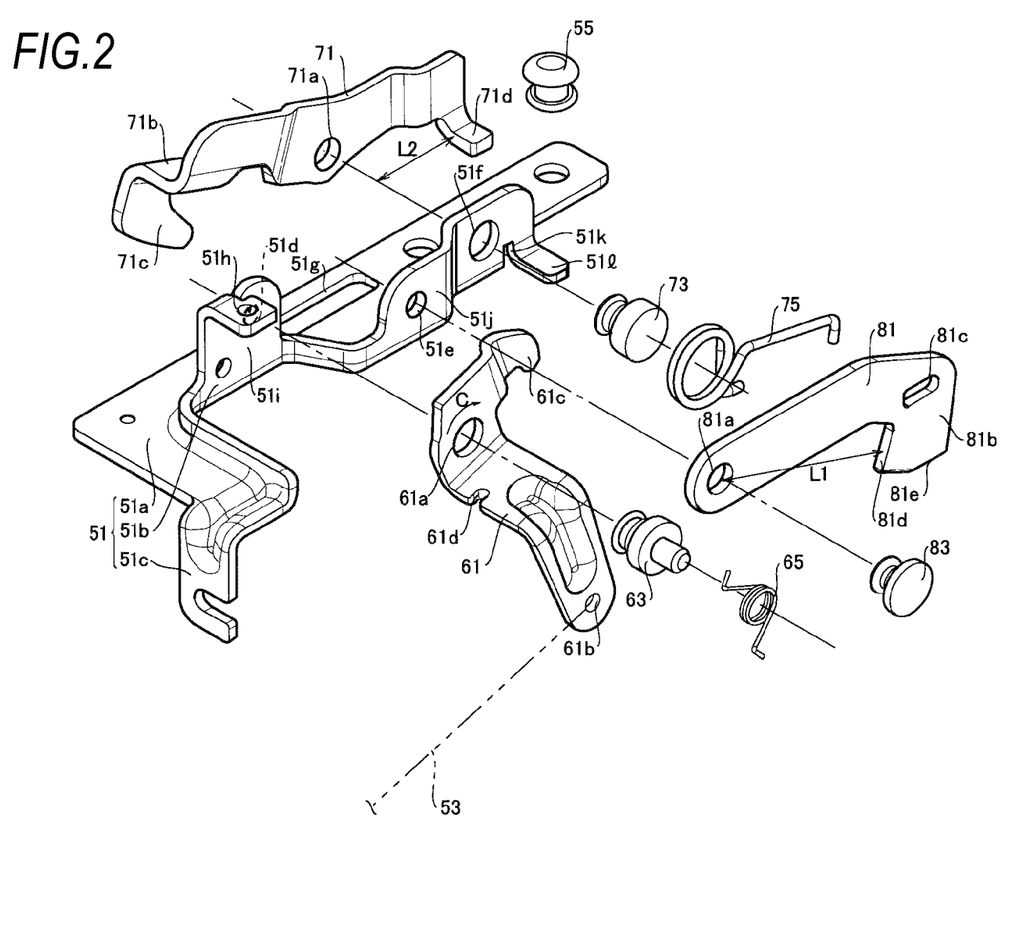
FIG. 2 is an exploded perspective view of the remarkable part shown in FIG. 1.

These two mechanisms will be described with reference to FIG. 1 and FIG. 2. FIG. 1 is a perspective view showing the remarkable part of the seat slide device according to an illustrative embodiment, and FIG. 2 is an exploded perspective view showing the remarkable part shown in FIG. 1.

(Walk-In Mechanism)

In FIG. 1, a top plate 19a of the upper rail 19 is exposed to the outside. A bracket 51 is provided on the top plate 19a by using a pin 55. The bracket 51 includes a base portion 51a disposed on the top plate 19a of the upper rail 19, an upright wall portion 51b bent upward from the base portion 51a and a cable support portion 51c for supporting a cable 53 (indicated by a two-dot chain line). One end of the cable 53 is connected to a position other than a tilting center axis of the seat back 5 and the other end thereof is connected to a control cam (to be described later).

The upright wall portion 51b is configured by two sections. The upright wall portion 51b is configured by a first upright wall section 51i and a second upright wall section 51j. The second upright wall section 51j is provided at a position offset in a vehicle width direction with respect to the position where the first upright wall section 51i is provided.

As shown in FIG. 1 and FIG. 2, the first upright wall section 51i is formed with a hole 51d and the second upright wall section 51j is formed with holes 51e, 51f. Further, the base portion 51a is formed with a hole 51g. In addition, a hole (not shown) is also formed in a portion of the top plate 19a of the upper rail 19, which is opposite to the hole 51g. Accordingly, it is possible to access an internal space of the upper rail 19 through the hole 51g formed in the bracket 51 and the hole (not shown) formed in the top plate 19a of the upper rail 19.

Furthermore, the lower rail 17 is provided with a position plate 91 that defines a walk-in area.

A control cam 61 is formed with a hole 61a. Further, the control cam 61 is disposed on one side of the first upright wall section 51i of the bracket 51. The control cam 61 is rotatably attached to the first upright wall section 51i of the bracket 51 by using a pin 63. The pin 63 is inserted through the hole 61a of the control cam 61 and the hole 51d of the bracket 51.

An unlock cam 71 is formed with a hole 71a. Further, the unlock cam 71 is disposed on the other side of the second upright wall section 51j of the bracket 51. The unlock cam 71 is rotatably attached to the second upright wall section 51j of the bracket 51 by using a pin 73. The pin 73 is inserted through the hole 71a of the unlock cam 71 and the hole 51f of the bracket 51.

A stopper cam 81 is formed at its one end side with a hole 81a. Further, the stopper cam 81 is disposed on one side of the second upright wall section 51j of the bracket 51. The stopper cam 81 is rotatably attached to the second upright wall section 51j of the bracket 51 by using a pin 83. The pin 83 is inserted through the hole 81a of the stopper cam 81 and the hole 51e of the bracket 51.

A hole 61b is formed in one-side rotation end (a lower-side rotation end) of the control cam 61 with respect to the pin 63. The other end of the cable 53 is connected to the hole 61b. The cable 53 is routed to be pulled when the seat back 5 is titled forward. Accordingly, when the seat back 5 is tilted forward, the control cam 61 is rotated in a direction of an arrow C around the pin 63. An unlock cam abutting portion 61c is formed on the other-side rotation end (an upper-side rotation end) of the control cam 61 with respect to the pin 63 and is abutted and pressed against the one-side rotation end of the unlock cam 71 from above.

The one-side rotation end of the unlock cam 71 is formed with an abutted portion 71b and a unlock portion 71c. The unlock cam abutting portion 61c of the control cam 61 is abutted and pressed against the abutted portion 71b. The unlock portion 71c is inserted into the internal space of the upper rail 19 through the hole 51g of the bracket 51 and a hole (not shown) formed in the top plate 19a of the upper rail 19. The unlock portion 71c is configured to, when the abutted portion 71b is pushed by the control cam 61, unlock the lock mechanism in the internal space of the upper rail 19.

On the other-side rotation end of the unlock cam 71 with respect to the pin 73, a protrusion 71d is formed. The protrusion 71d extends to one side of the upright wall portion 51b.

A rotation end of the stopper cam 81 is formed with an engaging portion 81b. The engaging portion 81b is bent downward with the pin 83 as a rotation base end and can be engaged with the position plate 91. The engaging portion 81b is formed with an elongated hole 81c. The protrusion 71d of the unlock cam 71 is loosely fitted into the elongated hole 81c, in which the protrusion 71d of the unlock cam 71 and the elongated hole 81c of the stopper cam 81 causes the unlock cam 71 and the stopper cam 81 is loosely fit to be rotated with interlocking with each other. Here, the elongated hole 81c may be a through hole or a bottomed hole.

The position plate 91 described above includes a plate stopper surface 91a intersecting the moving direction of the upper rail 19 and a plate unlock-maintaining surface 91b provided along the moving direction of the upper rail 19.

The engaging portion 81b of the stopper cam 81 is formed with a cam stopper surface 81d. When the seat 1 is moved toward the walk-in area from the rear side in a state where the walk-in mechanism is not operated, the cam stopper surface 81d is abutted against the plate stopper surface 91a of the position plate 91, thereby preventing the seat 1 from moving into the walk-in area. Furthermore, the engaging portion 81b of the stopper cam 81 is formed with a cam unlock-maintaining surface 81e. When the seat 1 is moved toward the walk-in area from the rear side in a state where the walk-in mechanism is operated, the cam unlock-maintaining surface 81e is slidably abutted against the plate unlock-maintaining surface 91b of the position plate 91, thereby allowing the seat 1 to move into the walk-in area.

In the present embodiment, a rotation radius (dimension L1 in FIG. 2) from the rotation center (center axis of the pin 83) of the stopper cam 81 to the cam stopper surface 81d of the engaging portion 81b of the stopper cam 81 is set to be longer than a rotation radius (distance to the protrusion 71d; dimension L2 in FIG. 2) from the rotation center (center axis of the pin 73) of the unlock cam 71 to the position at which the unlock cam 71 is interlocked with the stopper cam 81.

An intermediate portion of a spring (first biasing member) 65 is wound around the pin 63. One end of the spring 65 is locked to a groove 61d formed in one-side rotation portion of the control cam 61. The other end of the spring 65 is locked to a hole 51h of the first upright wall section 51i of the bracket 51. The spring 65 causes the control cam 61 to be biased in a direction opposite to a direction in which the one-side rotation end of the unlock cam 71 is pushed by the unlock cam abutting portion 61c. The biased control cam 61 is abutted against the side of the first upright wall section 51i adjacent to the hole 51h, so that the further rotation of the control cam 61 is prevented.

An intermediate portion of a spring (second biasing member) 75 is wound around the pin 73. One end of the spring 75 is locked to the protrusion 71d of the unlock cam 71 and the other end thereof is locked to a groove 51k of the second upright wall section 51j of the bracket 51. Here, the unlock cam 71 and the stopper cam 81 are rotated with interlocking with each other. Therefore, the biasing force of the spring 75 causes the unlock cam 71 to be biased in a direction opposite to a direction in which the lock mechanism is unlocked by the unlock portion 71c. Further, the biasing force of the spring 75 causes the stopper cam 81 to be biased in a direction in which the engaging portion 81b is engaged with the position plate 91. Furthermore, the biased stopper cam 81 is abutted against a protrusion 51l of the bracket 51, so that the further rotation of the stopper cam 81 and the unlock cam 71 is prevented.

Figure 4:
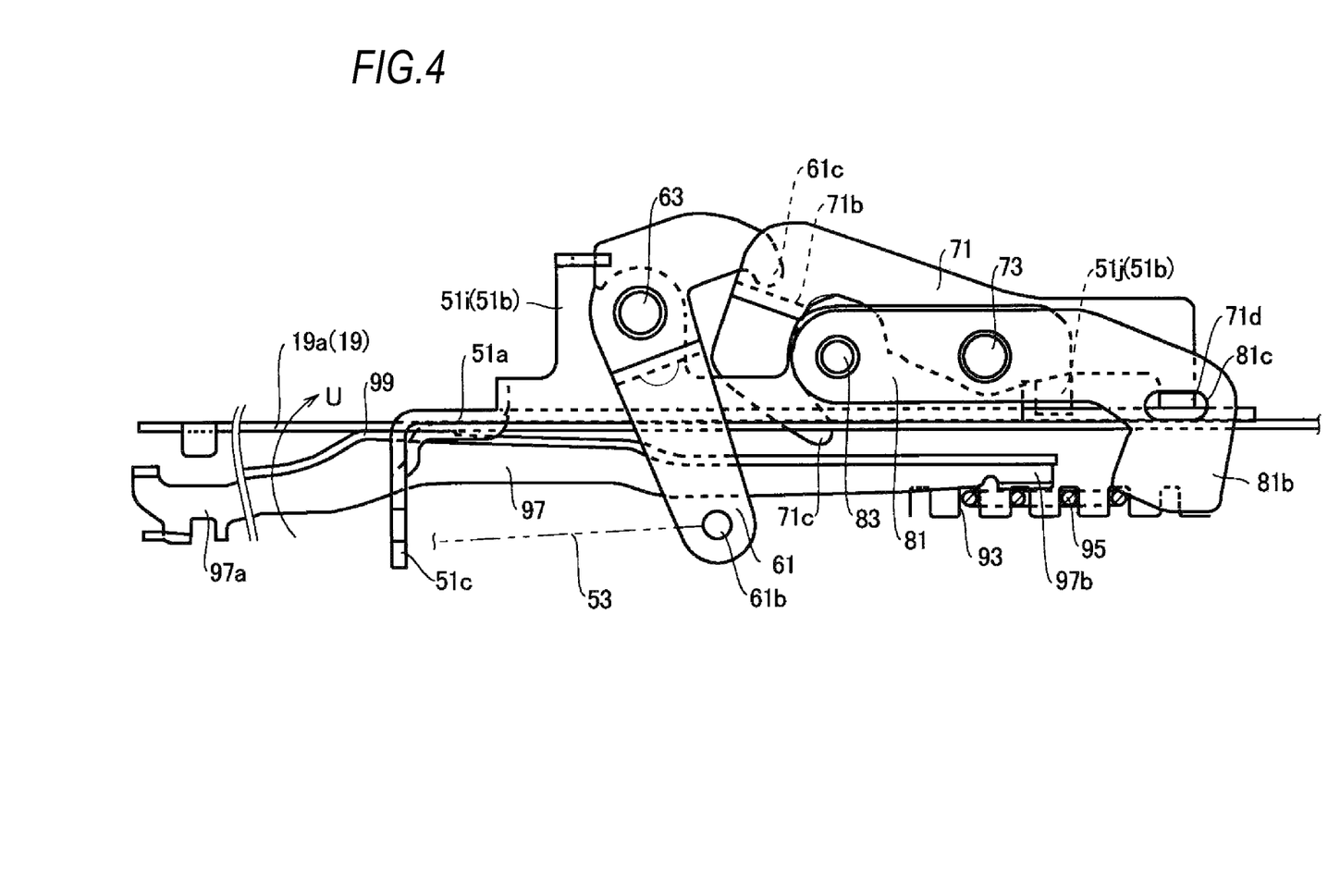
FIG. 4 is a view showing a state where a lock mechanism for locking/unlocking the movement of an upper rail is locked.
Figure 5:
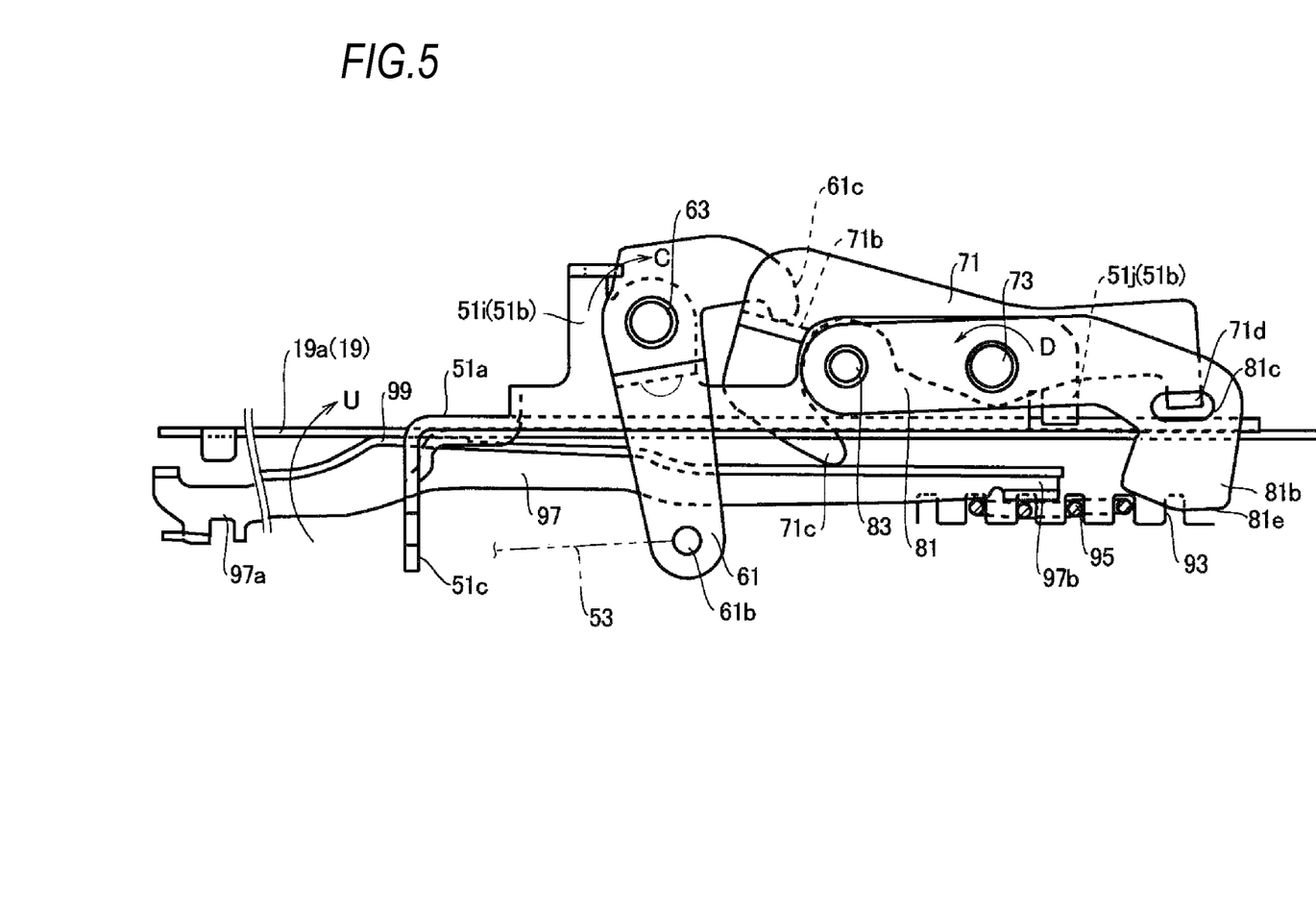
FIG. 5 is a view showing a state where the forward tilt of a seat back is started.
Figure 6:
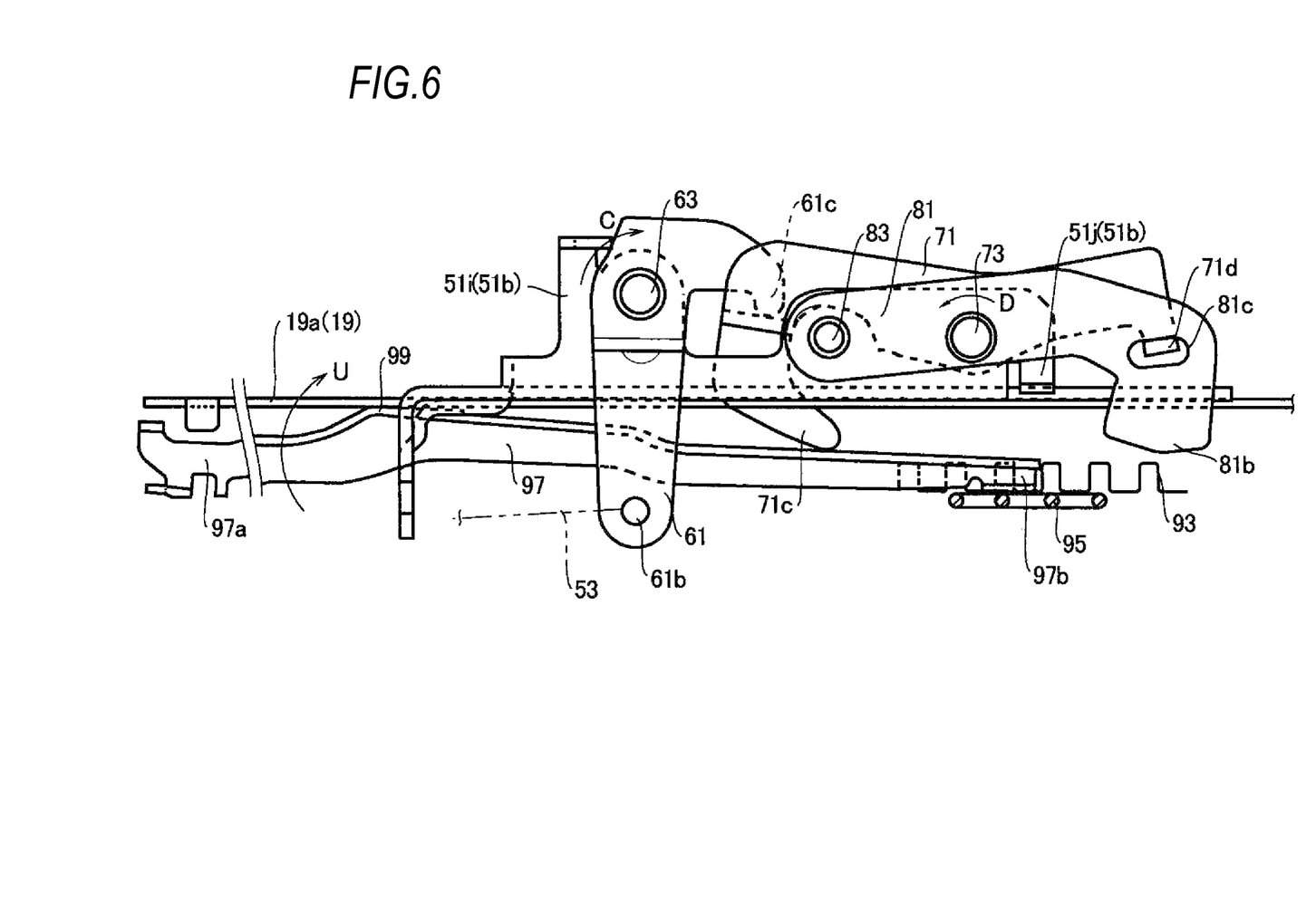
FIG. 6 is a view showing a state where the lock mechanism is unlocked.

Now, an operation of the walk-in mechanism is described with reference to FIG. 4 to FIG. 6. FIG. 4 is a view showing a state where the lock mechanism for locking/unlocking the movement of the upper rail 19 is locked. FIG. 5 is a view showing a state where the forward tilt of the seat back is started. FIG. 6 is a view showing a state where the lock mechanism is unlocked.

In these figures, the lower rail 17 is formed with a plurality of lock grooves 93 along a longitudinal direction thereof.

The upper rail 19 is provided with a lock member (lock spring) 95. The lock member 95 is formed by a process of bending a metallic wire and can be locked/disengaged from the lock groove 93. The lock member 95 is provided on the upper rail 19 in a state of being elastically deformed. The lock member 95 is engaged with the lock groove 93 by its elastic repulsive force (biasing force). That is, the lock member 95 itself serves as a lock biasing unit for biasing the lock member in a direction in which the lock member is engaged with the lock groove 93.

Furthermore, a release lever 97 is rotatably provided on the upper rail 19. The release lever 97 is formed at its upper surface with a rotation protrusion 99. The rotation protrusion 99 rotates in contact with the top plate 19a of the upper rail 19. A handle attachment portion 97a is formed on one-side rotation end (front side of the seat 1) of the release lever 97 with respect to the rotation protrusion 99. An unlock handle is attached to the handle attachment portion 97a. The unlock handle performs the unlocking of the lock mechanism by being pulled upward (by causing the release lever 97 to be rotated in the direction of the arrow U in the figure). An unlock portion 97b is formed on the other-side rotation end of the release lever 97. The unlock portion 97b can be abutted against the lock member 95. As the release lever 97 is rotated in the direction of the arrow U, the unlock portion 97b separates the lock member 95 from the lock groove 93 against the elastic repulsive force of the lock member 95.

FIG. 4 shows a locked state where the lock member 95 of the upper rail 19 is engaged with the lock groove 93 of the lower rail 17 and thus the movement of the upper rail 19 is locked.

When the seat back 5 is tilted forward, the cable 53 is pulled as shown in FIG. 5, and then against the biasing force of the spring 65, the control cam 61 is started to rotate in the direction of the arrow C in FIG. 5. Simultaneously, the unlock cam abutting portion 61c of the control cam 61 presses the abutted portion 71b of the unlock cam 71 to rotate the unlock cam 71 in a direction of an arrow D. In FIG. 5, the unlock portion 71c of the unlock cam 71 presses the other-side rotation end of the release lever 97 to rotate the release lever 97 in the direction of the arrow U, thereby, as shown in FIG. 6, the lock member 95 is separated from the lock groove 93 to be unlocked.

At this time, the stopper cam 81 which is rotated with interlocking with the unlock cam 71 is also rotated in the direction of the arrow D and the cam unlock-maintaining surface 81e of the engaging portion 81b is slidably abutted against the plate unlock-maintaining surface 91b of the position plate 91. As the cam unlock-maintaining surface 81e of the stopper cam 81 is abutted against the plate unlock-maintaining surface 91b of the position plate 91, the rotation in the unlock direction (direction opposite to the direction of the arrow D) of the unlock cam 71 is prevented and the unlocked state is maintained.

When the lock mechanism is unlocked, the seat 1 is moved forward, and the seat 1 is moved to the walk-in area (where the cam unlock-maintaining surface 81e of the stopper cam 81 is abutted against the plate unlock-maintaining surface 91b of the position plate 91), thereby the walk-in state of the seat is obtained, so that it is possible to facilitate the getting in and out to a rear seat.

When the seat in the walk-in state is returned to its original position, the seat 1 is moved rearward. The seat 1 is separated from the walk-in area and returned to its original position. The seat back 5 is erected rearward. Then, the lock mechanism in the unlocked state becomes a locked state.

Further, when the unlock handle described above is pulled upward and then the release lever 97 is rotated in the direction of the arrow U, the lock mechanism is unlocked. In this case, the control cam 61, the unlock cam 71 and the stopper cam 81 are not rotated. At this time, upon moving the seat 1 forward toward the walk-in area, the cam stopper surface 81d of the stopper cam 81 is abutted against the plate stopper surface 91a of the position plate 91, so that the seat 1 is prevented from moving further forward. That is, the seat 1 is prevented from moving into the walk-in area.

That is, by the stopper cam 81 and the position plate 91 of a movable-range restriction mechanism, the seat 1 is allowed to move into the walk-in area when the seat 1 is moved toward the walk-in area from the rear side in a state where the walk-in mechanism is operated. Further, the seat 1 is prevented from moving into the walk-in area when the seat 1 is moved toward the walk-in area from the rear side in a state where the walk-in mechanism is not operated and the lock mechanism is unlocked.

When the seat slide lock mechanism is unlocked in a state where the walk-in mechanism is not operated and then the seat is slid, the slide range of the seat is restricted to a predetermined range (normal slide range).

Furthermore, the present embodiment is configured as follows.

(1) The elongated hole 81c of the stopper cam 81 is formed so that a clearance in the moving direction of the upper rail 19 is provided between an inner wall surface of the elongated hole 81c and the protrusion 71d in a state where the lock mechanism is not unlocked by the unlock cam 71.

(2) The cam stopper surface 81d of the stopper cam 81 is formed as an inclined surface where a distance to the rotation center (center axis of the pin 83) of the stopper cam 81 is gradually shortened as forwarding toward the rear. That is, the cam stopper surface 81d of the stopper cam 81 is a surface, which rotates the stopper cam 81 when abutting against the plate stopper surface 91a of the position plate 91 in a state where the lock mechanism is not unlocked by the unlock cam 71 and on which a force in a direction in which the cam stopper surface 81d more approaches the plate stopper surface 91a of the position plate 91 is generated.

According to the above configurations, the following effects can be achieved.

(1) According to the movable-range restriction unit that allows the seat 1 to move into the walk-in area when the seat 1 is moved toward the walk-in area from the rear side in a state where the walk-in mechanism is operated and that prevents the seat 1 from moving into the walk-in area when the seat 1 is moved toward the walk-in area from the rear side in a state where the walk-in mechanism is not operated and the lock mechanism is unlocked, the slide range of the seat is restricted to a predetermined range (normal slide range) when the seat slide lock mechanism is unlocked in a state where the walk-in mechanism is not operated and the seat is slid.

(2) The control cam 61, the unlock cam 71 and the stopper cam 81 are rotationally held by the pin 63, the pin 73 and the pin 83, which are individual rotation shafts, respectively. Accordingly, it is possible to select the attachment position and the conversion degree of the rotation amount for each cam, as appropriate.

(3) The elongated hole 81c of the stopper cam 81 is formed so that a clearance in the moving direction of the upper rail 19 is provided between the inner wall surface of the elongated hole 81c and the protrusion 71d in a state where the lock mechanism is not unlocked by the unlock cam 71. Accordingly, when load in the front direction is applied to the seat when the unlock handle is pulled upward and the lock mechanism is unlocked, the seat moves forward and the cam stopper surface 81d of the stopper cam 81 is abutted against the plate stopper surface 91a of the position plate 91. However, the load due to the abutting is not transmitted to the unlock cam 71.

(4) The rotation radius (dimension L1 in FIG. 2) from the rotation center (center axis of the pin 83) of the stopper cam 81 to the cam stopper surface 81d of the engaging part 81b of the stopper cam 81 is set to be longer than the rotation radius (distance to the protrusion 71d; dimension L2 in FIG. 2) from the rotation center (center axis of the pin 73) of the unlock cam 71 to the position at which the unlock cam 71 is interlocked with the stopper cam 81.

Accordingly, when the cam stopper surface 81d of the stopper cam 81 is abutted against the plate stopper surface 91a of the position plate 91, a component force in the rotation direction of the stopper cam 81 becomes smaller in the abutting portion of the cam stopper surface 81d of the stopper cam 81 with the plate stopper surface 91a of the position plate 91. The cam stopper surface 81d of the stopper cam 81 is hardly separated from the plate stopper surface 91a of the position plate 91.

(5) The cam stopper surface 81d of the stopper cam 81 is formed as an inclined surface where a distance to the rotation center (center axis of the pin 83) of the stopper cam 81 is gradually shortened as forwarding toward the rear. Accordingly, the cam stopper surface 81d of the stopper cam 81 rotates the stopper cam 81 when abutting against the plate stopper surface 91a of the position plate 91 in a state where the lock mechanism is not unlocked by the unlock cam 71. Therefore, a force in a direction in which the cam stopper surface 81d more approaches the plate stopper surface 91a of the position plate 91 is generated. As a result, the cam stopper surface 81d of the stopper cam 81 is hardly separated from the plate stopper surface 91a of the position plate 91.

This disclosure is not limited to the above embodiments. In the above embodiment, the protrusion is provided on the unlock cam 71 and the elongated hole is provided on the stopper cam 81. However, on the contrary, the protrusion may be provided on the stopper cam 81 and the elongated hole may be provided on the unlock cam 71.

What is claimed is:
1. A seat slide device comprising:
a lower rail, which is provided on a floor side along a front-and-rear direction;
an upper rail, which is provided on a seat side and movably engaged with the lower rail;
a lock mechanism, which is configured to lock and unlock a movement of the upper rail;
a walk-in mechanism, which makes the seat be movable into a walk-in area located on a front side in the front-and-rear direction by unlocking the lock mechanism due to a forward tilt of a seat back of the seat; and
a movable-range restriction unit which:
    allows the seat to move into the walk-in area when the seat is moved toward the walk-in area from a rear side in a state where the walk-in mechanism is operated; and
    prevents the seat from moving into the walk-in area when the seat is moved toward the walk-in area from the rear side in a state where the walk-in mechanism is not operated and the lock mechanism is unlocked; and
wherein the movable-range restriction unit comprises;
    a position plate, which is provided on the lower rail and defines the walk-in area;
    a control cam, which is provided on the upper rail and is rotated due to tilting of the seat back;
    an unlock cam, which is provided on the upper rail, is rotated by being pushed by the control cam that rotates due to the forward tilt of the seat back and which unlocks the lock mechanism to operate the walk-in mechanism; and
    a stopper cam, which is provided on the upper rail, is rotated along with the rotation of the unlock cam and which includes an engaging portion that is able to engage with the position plate.

2. The seat slide device according to claim 1,
wherein the position plate includes:
a plate stopper surface, which intersects a moving direction of the upper rail; and
a plate unlock-maintaining surface, which is provided along the moving direction of the upper rail, and
wherein the engaging portion of the stopper cam includes:
a cam stopper surface, which is abutted against the plate stopper surface of the position plate and prevents the seat from moving into the walk-in area when the seat is moved toward the walk-in area from the rear side in a state where the walk-in mechanism is not operated; and
a cam unlock-maintaining surface, which is slidably abutted against the plate unlock-maintaining surface of the position plate and allows the seat to move into the walk-in area when the seat is moved toward the walk-in area from the rear side in an operating state of the walk-in mechanism, the cam unlock-maintaining surface to maintain the unlocked state of the lock mechanism with the unlock cam.

3. The seat slide device according to claim 1,
wherein the control cam, the unlock cam and the stopper cam are rotationally held by individual rotation shafts, respectively.

4. The seat slide device according to claim 1,
wherein an interlocking between the unlock cam and the stopper cam are configured by:
a protrusion, which is formed on a position other than the rotation center of one of the unlock cart and the stopper cam; and
a hole, which is formed on a position other than the rotation center of the other of the unlock cam and the stopper cam, the protrusion capable of being loosely fitted into the hole, and
wherein the hole is formed so that a clearance in the moving direction of the upper rail is provided between an inner wall surface of the hole and the protrusion in a state where the lock mechanism is not unlocked by the unlock cam.

5. The seat slide device according to claim 2,
wherein a rotation radius from the rotation center of the stopper cam to the cam stopper surface of the engaging portion of the stopper cam is set to be longer than a rotation radius from the rotation center of the unlock cam to the position at which the unlock cam is interlocked with the stopper cam.

6. The seat slide device according to claim 2,
wherein the cam stopper surface of the stopper cam is a surface that rotates the stopper cam when abutting against the plate stopper surface of the position plate in a state where the lock mechanism is not unlocked by the unlock cam, thereby generating a force in a direction in which the cam stopper surface more approaches the plate stopper surface of the position plate.

7. The seat slide device according to claim 5,
wherein the cam stopper surface of the stopper cam is a surface that rotates the stopper cam when abutting against the plate stopper surface of the position plate in a state where the lock mechanism is not unlocked by the unlock cam, thereby generating a force in a direction in which the cam stopper surface more approaches the plate stopper surface of the position plate.

* * * * *